United States Patent
Kobayashi et al.

(10) Patent No.: US 7,320,050 B2
(45) Date of Patent: Jan. 15, 2008

(54) DATA TRANSMISSION CONTROL METHOD AND STORAGE DEVICE

(75) Inventors: Hiromi Kobayashi, Kanagawa (JP);
Atsushi Kanamaru, Kanagawa (JP);
Takahiro Saito, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 189 days.

(21) Appl. No.: 11/031,494

(22) Filed: Jan. 7, 2005

(65) Prior Publication Data
US 2005/0166014 A1 Jul. 28, 2005

(30) Foreign Application Priority Data
Jan. 27, 2004 (JP) ............................ 2004-017998

(51) Int. Cl.
*G06F 12/00* (2006.01)
*G06F 13/00* (2006.01)

(52) U.S. Cl. .................. 711/112; 711/154; 711/167

(58) Field of Classification Search .............. 711/112, 711/100, 111, 113, 114, 154, 167; 710/5, 710/24
See application file for complete search history.

(56) References Cited

U.S. PATENT DOCUMENTS

| | | | | |
|---|---|---|---|---|
| 5,394,537 | A | * | 2/1995 | Courts et al. ............... 711/202 |
| 5,729,718 | A | * | 3/1998 | Au ............................. 711/167 |
| 5,787,482 | A | * | 7/1998 | Chen et al. ................. 711/158 |
| 5,968,109 | A | * | 10/1999 | Israni et al. ................ 701/208 |
| 6,134,586 | A | * | 10/2000 | Walker ......................... 725/87 |
| 6,272,565 | B1 | * | 8/2001 | Lamberts .................... 711/112 |
| 6,308,177 | B1 | * | 10/2001 | Israni et al. ................. 707/100 |
| 6,389,508 | B1 | | 5/2002 | Tamura |
| 6,851,011 | B2 | * | 2/2005 | Lin ............................... 711/4 |
| 2002/0059478 | A1 | | 5/2002 | Yamada |
| 2004/0015653 | A1 | * | 1/2004 | Trantham ................... 711/113 |
| 2004/0128442 | A1 | * | 7/2004 | Hinshaw et al. ............ 711/114 |
| 2005/0144332 | A1 | * | 6/2005 | Nellitheertha ................ 710/15 |

FOREIGN PATENT DOCUMENTS

JP 06-259198 9/1994

OTHER PUBLICATIONS

Huffman, Amber; Clark, Joni. "Serial ATA: Native Command Queuing." A Joint White Paper by Intel Corporation and Seagate; 2003.*

* cited by examiner

*Primary Examiner*—Tuan V. Thai
(74) *Attorney, Agent, or Firm*—Townsend and Townsend and Crew LLP; Patrick Duncan

(57) ABSTRACT

Embodiments of the invention raise the performance of a HDD by controlling the timing of notifying of command completion. In one embodiment, transmission of command completion notifications to a host is managed by a host interface manager. If two data write addresses respectively for two queued commands are adjacent or near to each other, that is, these addresses on the magnetic disk can be accessed without rotational latency, the host interface manager postpones the transmission of a command completion notification (X) concerning the first write command (X). Two command completion notifications (X) and (Y) are performed at a time after the write data (Y) for the next command is transmitted and its write to the medium is completed.

19 Claims, 9 Drawing Sheets

Fig. 3

| No. of Sectors | Tag | Starting Sector | Control Data | Command ID |
|---|---|---|---|---|

Command

Fig. 4

| Transfer Direction | Tag | Offset | Transferred Data Bytes | Control Data |
|---|---|---|---|---|

Setup Frame

Fig. 5

| Command Status | Control Data |
|---|---|

Command Completion Notification

DATA TRANSMISSION CONTROL METHOD AND STORAGE DEVICE

CROSS-REFERENCES TO RELATED APPLICATIONS

This application claims priority from Japanese Patent Application No. 2004-17998, filed Jan. 27, 2004, the entire disclosure of which is incorporated herein by reference.

BACKGROUND OF THE INVENTION

The present invention relates to a data transmission control device and a storage device and, in particular, to timing control of command completion notification.

Devices using various types of media such as optical disks and magnetic tapes are known as information recording and reproducing devices. Among them, hard disk drives have become popular as storage devices for computers to such an extent that they are one of the storage devices indispensable for today's computers. Further, not limited to computers, their application is widening more and more due to the superior characteristics with the advent of moving picture recording/reproducing devices, car navigation systems, removable memories for digital cameras and so on.

Each magnetic disk used in hard disk drives has a plurality of tracks formed concentrically and each track is partitioned into a plurality of sectors. In each sector, sector address information and user data are stored. Either data write to a sector or data read from the sector is enabled by the head which accesses the desired sector according to the sector address information. A signal read out from a magnetic disk through data read operation is subjected to waveform shaping, decoding processing and other prescribed signal processing by a signal processing circuit before it is transmitted to the host. Likewise, data transferred from the host is subjected to prescribed signal processing by a signal processing circuit and then written to the magnetic disk.

For data transmission between a host and a hard disk drive, such an interface protocol as the SCSI interface or ATA interface is usually used. In particular, the ATA interface is used by many computers due to its improved interfacing capability and low cost. The ATA interface is also widely used by storage devices including other types of devices such as optical disk storage devices. As recording media have advanced in recording density, however, the demand for higher performance has occurred. There have been intensifying demands for the ATA interface to raise the data transfer rate. Accordingly, a serial transfer ATA interface is proposed to replace existing parallel transmission protocols.

Serial ATA specifications are being developed by the "Serial ATA Working Group." In "Serial ATA II: Extensions to Serial ATA 1.0 Specification" which is already released, some techniques, not encompassed by the existing parallel ATA, are employed. One of them is a command queuing technique called NCQ (Native Command Queuing). NCQ allows a hard disk drive itself to internally determine an order in which the queued commands are to be executed. This makes it possible to effectively reduce latencies which are attributable to the mechanical internal operations of the hard disk drive.

One example featuring the NCQ technique concerns the issuance of command completion notifications. The status of each queued command is managed by the SActive register on the host. The status of a queued command can be changed from "outstanding" to "complete" by clearing the corresponding bit of the SActive register. Clearing bits of the SActive register is implemented by a data frame from the hard disk drive. This data frame is called a "Set Device Bits FIS." Each command completion notification can be transmitted at any timing. For example, the hard disk drive can either successively transmit "Set Device Bits FIS" to the host for the corresponding plural commands or use a single "Set Device Bits FIS" which notifies the host that two commands have completed.

NCQ aside, an example of a technique concerning the control of command completion notification is disclosed in Japanese Patent Laid-Open No. 2001-312373. In this technique, the timing of issuing a command complete signal is controlled in order to prevent the data in the sector buffer from being overwritten by a newly accepted command. If a write command is newly accepted when there are outstanding write commands accepted earlier, the hit status indicating the positional relations with the LBAs for the outstanding commands is checked to rearrange the order in which data write to the recording medium is to be done, and then write data is recorded in the medium according to the rearranged order. At this time, if the free space in the sector buffer is not larger than a predefined size and the hit status is NOHIT, recording to the medium is started with priority for the newly accepted command without issuing a command complete signal.

BRIEF SUMMARY OF THE INVENTION

In Japanese Patent Laid-Open No. 2001-312373, however, the timing of transmitting command completion notification is controlled from the viewpoint of preventing data in the sector buffer from being overwritten. Therefore, appropriate performance improvement cannot be attained since, for example, media access, including seek time and rotational latency, and command rescheduling are not taken into consideration. With this situation behind, it is a feature of the present invention to raise the performance of a storage device by controlling the issuance of command completion notification.

According to a first aspect of the present invention, a data transmission control method for controlling data transmission between a host and a storage device comprises: acquiring a queued first command; acquiring address information regarding first data which is for the first command; transmitting the first data between the host and the storage device; acquiring a queued second command; acquiring address information regarding second data which is for the second command; based on the address information regarding the first data and second data, determining whether to transmit the second data between the host and the storage device before transmitting a completion notification concerning the first command to the host from the storage device; according to the determination made in the determining step, transmitting the second data between the host and the storage device; and after processing of the first command is completed, transmitting the completion notification concerning the first command to the host after the second data is transmitted. Since whether to transmit the completion notification concerning the first command before or after transmitting the second data is determined based on the address information regarding the first and second data, it is possible to raise the performance of the storage device.

In some embodiments, if the difference between the address for the first data and the address for the second data is smaller than a predefined value, the determining step determines to transmit the second data before transmitting the completion notification concerning the first command.

In some embodiments, the first and second commands are respectively to perform media accesses to rotating media; and based on the address information regarding the first data and second data, the determining step determines to transmit the second data before transmitting the completion notification concerning the first command if the media access to the second data is possible without rotational latency after the media access to the first data.

The data transmission control method is particularly useful if the first and second commands are write commands which are respectively to write data to media. It is preferable that the first and second commands are respectively to write data to rotating media; the second command is queued following the first command; and based on the address information regarding the first data and second data, the determining step determines to transmit the second data before transmitting the completion notification concerning the first command if write of the second data to the media is possible without rotational latency after write of the first data to the media.

In specific embodiments, the first command and the second command are commands which are respectively to write data to rotating media; the second command is queued following the first command; and the determining step determines to transmit the second data before transmitting the completion notification concerning the first command if the address for the second data is adjacent to the address for the first data.

According to a second aspect of the invention, a data transmission control method for controlling data transmission between a host and a storage device comprises: acquiring a queued first command; executing the first command; acquiring information regarding queued commands; and based on the time for executing the first command and the time for rescheduling the queued commands, determining the timing of transmitting a command completion notification concerning the first command. Thus, appropriate rescheduling can be done.

In some embodiments, the time for executing the first command is estimated according to the sector length of the data for the first command. It is preferable that the time for executing the first command is estimated according to the media access time for the data for the first command. It is also preferable that the time for rescheduling the queued commands is estimated according to the population of the queued commands. It is also preferable that if the sector length of the data for the first command is not larger than a predefined value and the number of the queued commands is not smaller than a prescribed value, the command completion notification concerning the first command is postponed.

In specific embodiments, if the media access time for the data for the first command is not larger than a prescribed value and the number of the queued commands is not smaller than a prescribed value, the command completion notification concerning the first command is postponed. The command completion notification concerning the first command can be transmitted after the rescheduling of the queued commands is complete.

According to a third aspect of the present invention, a data transmission control method for controlling data transmission between a host and a storage device comprises: from a command queue, acquiring a command which is to perform an access to media; executing the command; and if the time for executing the command is not smaller than a predefined time, transmitting pending command completion notifications to the host. This makes it possible to reduce the number of pending command completion notifications and to issue newly accepted commands.

According to a fourth aspect of the present invention, a storage device comprises a command queue where plural commands transmitted from a host are stored; a command order determination section which determines to execute a first command and a second command, which are stored in the command queue, in this order; a data transmission control section which, based on address information regarding first data for the first command and address information regarding second data for the second command, determines whether to postpone the timing of transmitting a completion notification concerning the first command to the host until the second data is transmitted to or from the host; and a data transmission section which, under the control of the data transmission control section, transmits the first data to or from the host, and after processing of the first command is completed and the second data is transmitted, transmits the completion notification concerning the first command. Since whether to transmit the completion notification concerning the first command before or after transmitting the second data is determined based on the address information regarding the first and second data, it is possible to raise the performance of the storage device.

In some embodiments, the storage device further comprise rotating media where data is stored; the first and second commands are commands which are respectively to write data to the media; and if the difference between the address for the first data and the address for the second data is smaller than a predefined value, the data transmission control section determines to postpone the timing of transmitting the completion notification concerning the first command to the host until the second data is transmitted from the host.

In specific embodiments, the storage device further comprises rotating media where data is stored; the first and second commands are commands which are respectively to write data to the media; and if the address for the second data is adjacent to the address for the first data with a difference being smaller than a predefined value, the data transmission control section determines to postpone the timing of transmitting the completion notification concerning the first command to the host until the second data is transmitted from the host.

According to a fifth aspect of the present invention, a storage device comprises: rotating media on which data is stored; a command queue where plural commands transmitted from a host are stored; a command order determination section which determines an order in which the commands stored in the command queue are to be executed; a data transmission control section which, based on the length of the data for an execution command determined by the command order determination section and used for access to the media and on the number of the commands stored in the command queue, determines the timing of transmitting a command completion notification concerning the execution command to the host; and a data transmission section which transmits the command completion notification to the host in response to a request from the data transmission control section. Since the timing of transmitting the command completion notification concerning the execution command is determined according to the length of the data for the execution command and the number of the commands stored in the command queue, command rescheduling can be done appropriately.

According to a sixth aspect of the present invention, a storage device comprises rotating media on which data is stored; a command queue where plural commands transmitted from a host are stored; a command order determination section which determines an order in which the commands stored in the command queue are to be executed; a data transmission control section which, based on the media access time for the data for an execution command determined by the command order determination section and used for access to the media and on the number of the commands stored in the command queue, determines the timing of transmitting a command completion notification concerning the execution command to the host; and a data transmission section which transmits the command completion notification to the host in response to a request from the data transmission control section. Since the timing of transmitting the command completion notification concerning the execution command is determined according to the access time for the execution command and the number of the commands stored in the command queue, command rescheduling can be done appropriately.

According to embodiments of the present invention, it is possible to raise the performance of a storage device by controlling the issuance of command completion notification.

BRIEF DESCRIPTION OF THE DRAWINGS

FIG. 3 shows an example of a command data format in the embodiment.

FIG. 4 shows an example of a setup frame data format in the embodiment.

FIG. 5 shows an example of a command completion notification data format in the embodiment.

DETAILED DESCRIPTION OF THE INVENTION

Figure 1:
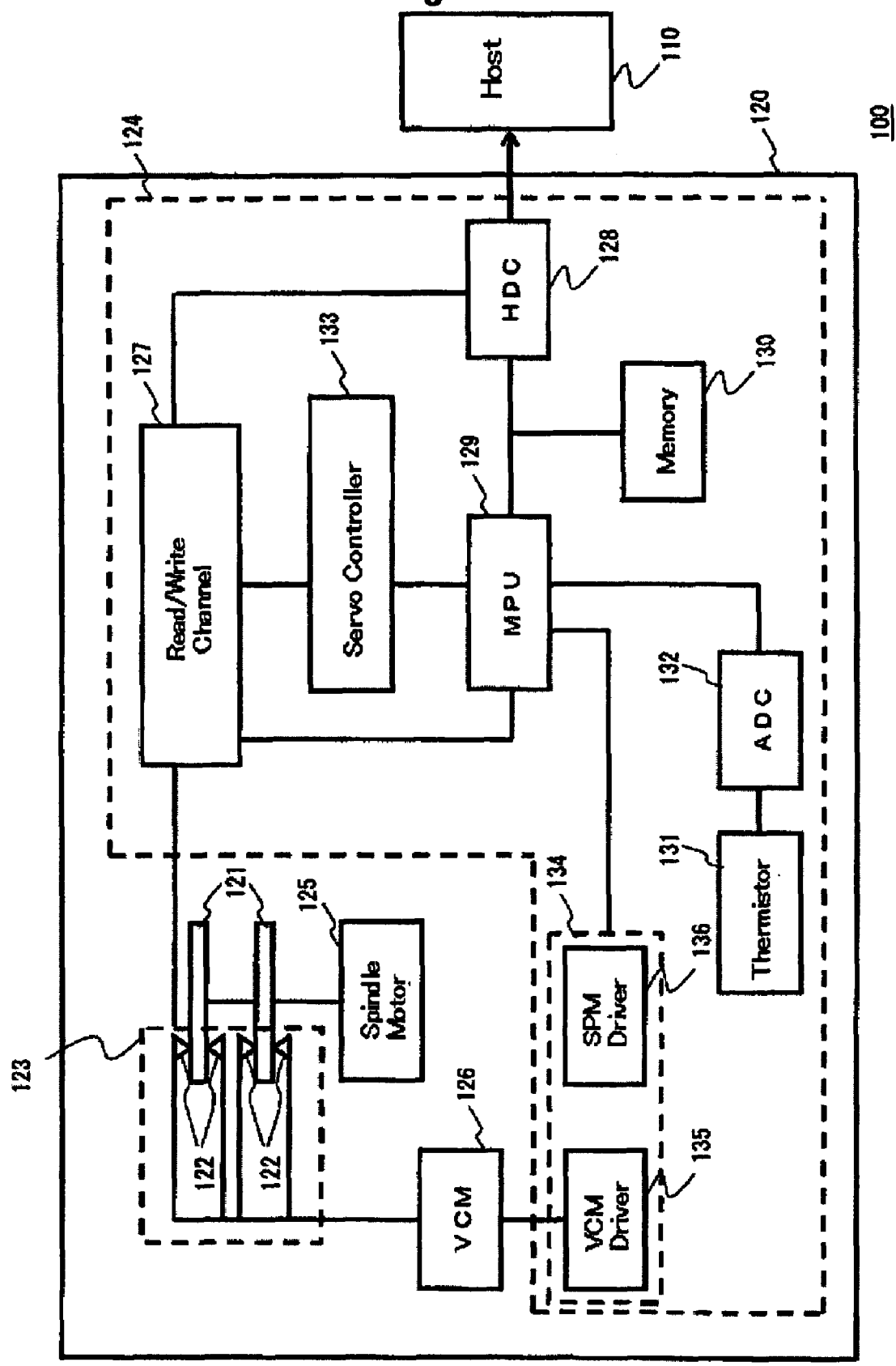
FIG. 1 is a block diagram illustrating the general configuration of a hard disk drive according to an embodiment of the present invention.

Embodiments of the present invention will thereinafter be described. The following describes how the present invention is applicable and is not intended to limit the scope of the present invention to the embodiment cited below. In the interest of straightforwardness, omission and simplification are made, where appropriate, in the following description and drawings. Those skilled in the art will be able to easily make modifications, additions and alterations to each element of the embodiment within the scope of the preset invention. Identical reference numerals are used to designate identical elements that are common to the figures and redundant description is omitted as appropriate in the interest of straightforwardness.

FIG. 1 is a block diagram showing a general configuration of a data processing system 100 in the present embodiment. The data processing system 100 includes a host 110 which is a computer, a digital camera or the like performing data processing; and a hard disk drive 120 which is a storage device storing data transmitted from the host 110. The hard disk drive 120 includes in the frame thereof one or more magnetic disks 121 as an example of a medium; a head stack assembly 123 having magnetic heads associated respectively with the recording surfaces of the magnetic disk; and a controller 124 which controls these elements in order to write data to the magnetic disk 121 and read data from the magnetic disk 121.

Host user data transmitted from the host 110 is subjected to necessary processing and converted to a write signal by the controller 124 before being sent to the head stack assembly 123. According to the acquired write signal, the magnetic heads 122 write data to the recording surfaces of the magnetic disk 121. On the other hand, a read signal retrieved from the magnetic disk 122 by the magnetic heads 122 is converted to a digital signal and is subjected to necessary processing by the controller 124 before being transmitted to the host 110.

The magnetic disk 121 is a nonvolatile recording medium having magnetic layers which are magnetized to record data. When the hard disk drive 120 is operating, the magnetic disk 121 is driven to rotate at a prescribed constant speed around the spindle of the spindle motor 125. When the hard disk drive 120 is not operating, the magnetic disk 121 remains stationary. Plural tracks are concentrically formed on the surfaces of the magnetic disk 121 as data storage partitions and each track is circularly partitioned into plural circular sectors.

Servo data recording areas are formed on the surfaces of the magnetic disk 121. Typically, the magnetic disk 121 has plural servo data recording areas formed radially. In each sector, a servo data recording area and a user data recording area are formed. Servo data is retrieved by the magnetic heads 122, making it possible to acquire information about the position of the magnetic heads 122. The servo data includes track data providing track number information; sector data providing sector number information; and a burst pattern.

Mounted in the frame so as to be able to pivotally move along the surfaces of the magnetic disk 121, the head stack assembly 123 is driven by a voice coil motor (VCM) 126. Magnetic heads 122 each having a slider and a magnetic thin film element are provided at the tip of the head stack assembly 123. As the head stack assembly 123 pivotally moves, the magnetic heads 122 move in the radial direction of the magnetic disks 121 over the surfaces thereof. This allows the magnetic heads 122 to access desired tracks.

The head stack assembly 123 has two magnetic heads 122 for each magnetic disk 121 and the two magnetic heads are respectively associated with the top and bottom surfaces of the magnetic disk 121. When data write/read operation is not made, the magnetic heads 122 are typically saved either to ramp structures (not shown in the figure) located outside the magnetic disk 121 or, in a CSS (Contact Start and Stop)

system, to a CSS zone arranged in an inner place. The magnetic heads 122 write data to the magnetic disk 121 or read servo data and user data from the magnetic disk 121.

As shown in FIG. 1, the controller 124 includes a read/write channel 127, a hard disk controller (HDC) 128, a microprocessor unit (MPU) 129, a memory 130, a thermistor 131, an analog to digital converter (ADC) 132, a servo controller 133, and a motor driver unit 134. The motor driver unit 134 includes a voice coil motor driver (VCM driver) 135 and a spindle motor driver (SPM driver) 136.

The read/write channel 127 performs write operation on data acquired from the host 110. In a write operation, write data supplied from the HDC 128 is code-modulated by the read/write channel 127. The thus code-modulated write data is then converted into a write signal (current signal) so that the write signal is supplied to the magnetic heads 122. The magnetic heads 122 write the data to the magnetic disk 121 by letting current flow through the coils according to the obtained signal. In addition, when data is to be supplied to the host 110, read operation is performed. In a read operation, data is picked up from a read signal supplied from the magnetic heads 122 and is subjected to decode processing by the read/write channel 127. The retrieved data, after subjected to decode processing, is supplied to the hard disk controller 128.

Operating according to microcodes loaded to the memory 130, the MPU 129 executes not only the general control of the hard disk drive 120, including magnetic head 122 positioning control, interface control, and defect management, but also data processing-related necessary processing. When the hard disk drive 120 is started, the microcodes to operate on the MPU 129 and the data to be required for control and data processing are loaded to the memory 130 from the magnetic disk 121 or a ROM (not shown in the figure).

Digital data read out by the read/write channel 127 includes servo data in addition to user data from the host 110. The servo controller 133 extracts servo data from the readout data acquired from the read/write channel 127. The servo data includes track data, sector data, and a burst pattern. The extracted servo data is transferred to the MPU 129 from the servo controller 133.

According to microcodes, the MPU 129 performs magnetic head 122 positioning control processing by using the servo data. Control data from the MPU 129 is output to the VCM driver 134. The VCM driver 134 supplies drive current to the VCM 126 according to the control signal. In addition, the MPU 129 sets SPM control data to a register in the motor driver unit 134 according to microcodes in order to control the rotation of the spindle motor 125. The SPM driver 136 executes the rotational control of the spindle motor 125 according to the set SPM control data.

The HDC 128 has a capability of interfacing with the host 110. The HDC 128 receives control data including user data and read, write and other commands transmitted from the host 110. The received user data is transferred to the read/write channel 127. In addition, readout data from the magnetic disk, acquired from the read/write channel 127, or control data for data transfer is transmitted to the host 110 by the HDC 128. Further, the HDC 128 executes others including code generation processing for error checking and error correction of the user data.

Transmission of control data and user data between the HDC 128 and the host 110 is controlled by the hard disk controller 128 and microcodes operating on the MPU 129. In particular, the hard disk drive 120 in this embodiment has a command queuing facility for certain commands from the host. Sequencing of commands for execution in the hard disk controller 128 and sequencing of control data and user data for host-device transmission are controlled and managed with the object of improving the performance of the hard disk drive 120.

Hereinafter, command queuing and control of host-device data transmission between the hard disk drive 120 and the host 110 are described. The host-device interface of this embodiment allows the hard disk drive 120 to internally control the execution order of certain operations so as to improve the performance of the hard disk drive 120. In particular, in host-device data communication in this embodiment, timing of transmitting command completion notification from the hard disk drive 120 to the host 110 is effectively controlled so as to contribute to improve the performance. Data transmission control as done in this embodiment, if applied to, for example, the SATII specification which supports NCQ (Native Command Queuing), can contribute to improve the performance of drives. Although reference is made to NCQ where necessary in the following description of this embodiment, the scope of the present invention is not limited to NCQ.

Figure 2:
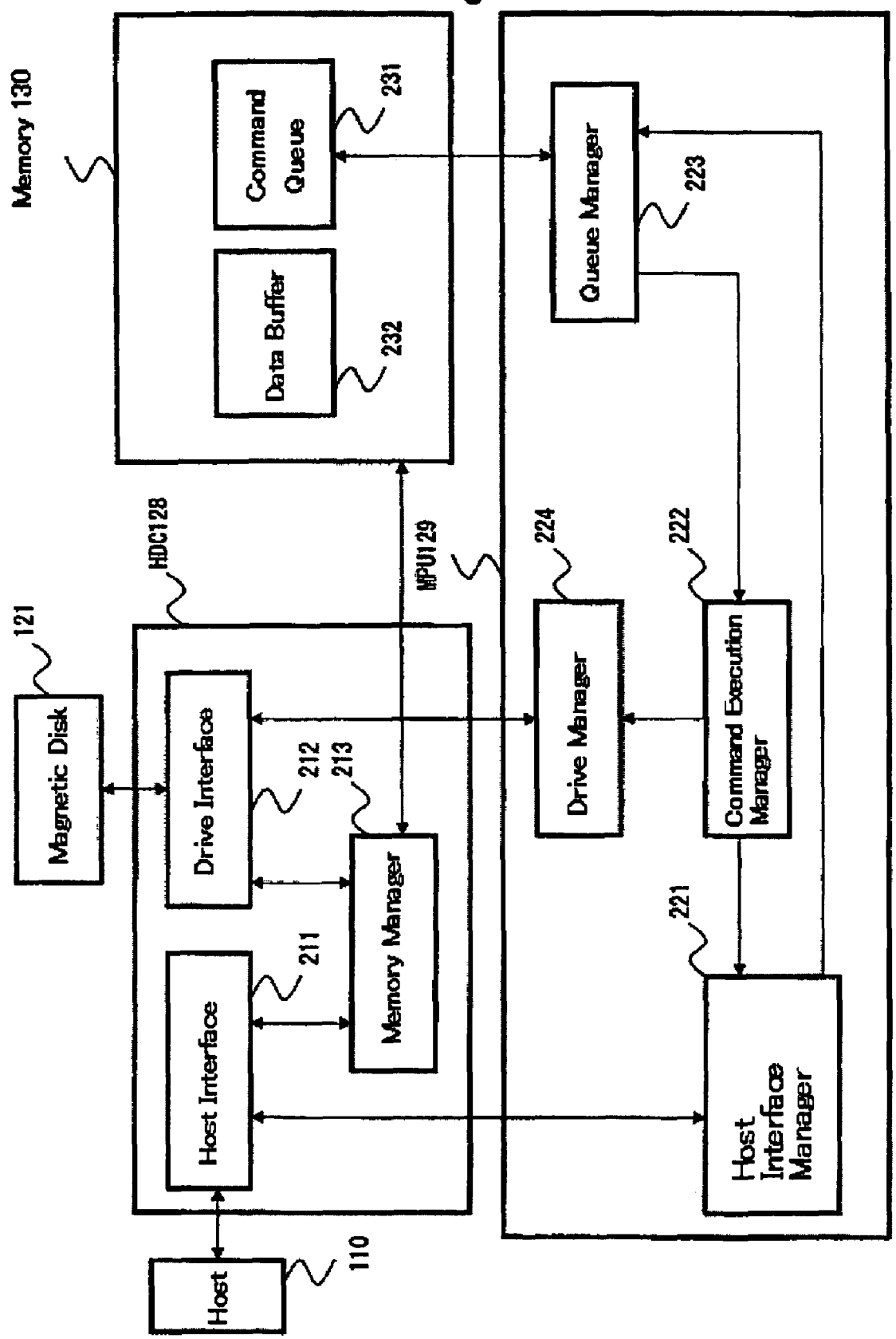
FIG. 2 is a block diagram illustrating the logical configuration of a host-device interface which controls host-device data transmission as predefined in the embodiment.

FIG. 2 is a block diagram illustrating a logical configuration which controls host-device data transmission in the host-device interface of this embodiment. The HDC 128 includes a host interface 211, a drive interface 212 and a memory manager 213. Microcodes which operate on the MPU 129 allow the MPU 129 to function as a host interface manager 221, a command execution manager 222, a queue manager 223 and a drive manager 224. The memory 130 can temporally store commands and data so as to function as a command queue 231 and a data buffer 232.

The host interface 211 functions as a data transmitting section by executing actual data transmission processing with the host 110. The drive interface 212 performs actual data input/output processing with the magnetic disk 121, an example of a medium (or the read write channel 127). The memory manager 213 performs intermediary processing for commands and user data between other functional blocks and the memory 130 in the hard disk controller 128 by controlling the data storage of the memory 130.

Functioning as a data transmission control section to manage the host interface 211, the host interface manager 221 exchanges certain notifications and instructions with the host interface 211. In addition, the host interface manager 221 functions as an interface between the hard disk controller 128 and other functional blocks operating in the MPU 129. The host interface manager 221, based on notification, request, and other data obtained from other functional blocks, controls the order of data to be transferred between the host interface 211 and the host 110. In particular, the host interface manager 221 controls the timing of issuing command completion notification to the host 110 so as to contribute to improvement in performance.

The queue manager 223 executes re-scheduling of commands queued in the command queue 231. The queue manager 223 functions as a command sequence determining section to appropriately determine the command execution order with the object of optimizing the performance. According to the order determined by queue manager 223, the command execution manager 222 controls command execution. The drive manager 224 controls the drive interface 212 so that data write and data read between the drive interface 212 and the magnetic disk 121 are controlled. The drive manager 224 controls the drive interface 212 in compliance with requests from the command execution manager 222.

The following provides a basic description of how command queuing operates in this embodiment. Note that the commands transmitted from the host 110 may include those which are not to be queued in addition to those which are to be queued. For example, for the SATII specification, not only the NCQ protocol but also the DMA (Direct Memory Access), PIO (Programmed I/O), and other protocols can be supported simultaneously. It is possible to determine whether a command is to be queued by referring to, for example, the identifier attached to the command. In the following, commands to be queued and data transmission therefor are described. In the following, read commands and write commands are presented as commands to be queued.

FIG. 3 shows an example of a command data format in this embodiment. The data format in the figure can be applied to a read or write command. In this embodiment, a command to be queued includes a tag field. Each command to be queued is identified by the tag associated with the command. The number of outstanding commands identifiable by tags is determined by the queue depth. For NCQ, 32 commands are respectively identified by tags which represent 0 through 31.

"Starting Sector" in FIG. 3 designates the starting sector of data requested to be transferred. "No. of Sectors" is counted from the starting sector. Sector identification is possible by, for example, LBA (Logical Block Addressing). The command is also given "Command ID" to identify the command; a read command or a write command. Besides them, the command can include other control data such as data for cache control. For NCQ, "Read FPDMA (First Party DMA) Queued" or "Write FPDMA Queued" corresponds to this command cited as an example.

A read or write command transmitted from the host 110 is received by the host interface 211 and stored in the command queue 231 through the memory manager 213. The host interface 211 notifies the host interface manager 221 that the command has been entered. Receiving the notification from the host interface 211, the host interface manager 221 requests the host interface 211 to clear "busy." After the command is received, if the host interface 211 is ready to receive a new command, "busy" is cleared before user data is transferred.

Further, the host interface manager 221 requests the queue manager 223 to re-arrange the command execution order. In the command queue 231, plural outstanding commands can be queued. The queue manager 223 reschedules the command sequence by determining the execution order of commands pending in the command queue 231 so that these commands will be executed in optimal order in view of performance. In particular, the command execution order is determined so as to minimize the head's media access time including the seek latencies and rotational latencies.

When rescheduling is done, the queue manager 223 determines the execution order according to a prescribed algorithm in consideration of various parameters. For example, reference is made to many parameters such as seek length, access start position, actuator operation profile, rotational position, and cache status. The rescheduling algorithm for determining the command execution order is not described in detail since the algorithm is widely known.

The command execution manager 222 manages command execution according to the order determined by the queue manager 223. As mentioned above, host-device user data transfer in this embodiment can be controlled internally by the hard disk drive 120. Data transfers to the host 110 and data transfers from the host 110 can be optimized in timing by the hard disk drive 120 so as to reduce the internal operational latency.

Data associated respectively with individual commands can be transferred in arbitrary order. In addition to this capability, it is preferable in terms of processing efficiency to divide data associated with a command into data portions and transfer these data portions in arbitrary order. Further, it is more preferable that a partial data transfer for a command can be interleaved between partial data transfers for another command. For NCQ, this transfer protocol is supported. In NCQ, if "non-zero buffer offsets" are enabled, that is, offsets can be set to designate data portions, and "guaranteed in-order delivery" is disabled, that is, inconsecutive transfers are allowed, data portions can be transferred in the aforementioned way. It is assumed in the following description that this condition is met.

In order for the hard disk drive 120 to control user data transfers, setup frames for data transfers are issued by the hard disk drive 120 to the host 110. FIG. 4 shows an example of a setup frame data format in this embodiment. "DMA Setup FIS (Frame Information Structure)" for NCQ is an example of a setup frame. The setup frame includes a field which specifies either read or write, a transfer direction in which data is to be transferred. The tag field designates a queued outstanding command for which data is to be transferred. As mentioned above, for example, 32 commands are respectively identified by tags representing 0 through 31.

To make possible a partial data transfer for a command, the offset field indicates an offset for the partial data transfer. "Non-zero buffer offsets" for NCQ are examples of such an offset field. The transfer data bytes field indicates the number of data bytes to be transferred. Combined with the offset, this field makes possible a partial data transfer for a command. Besides them, the setup frame can include a control data field which carries frame type information, control data transfer information, and the like.

Upon completion of a user data transfer, a command completion notification is transmitted from the hard disk drive 120 to the host 110. In this embodiment, command completion notifications are transmitted under the control of the host interface manager 221. The command completion notification for a command is not always transmitted immediately after the command is completed. The hard disk drive 120 can output the command completion notification at appropriate timing so as to improve the performance. For example, the command completion notifications for plural commands may be transmitted in series after processing of all of these commands is completed. Preferably one command completion notification can notify that plural commands have completed successfully. This can reduce the number of times the host 110 is interrupted.

FIG. 5 shows an example of a data format for command completion notification. In addition to a control data field carrying frame type information and the like, each command completion notification includes a command status field. The command status field indicates the status of each command identified by its tag. Preferably, the command status field is composed of as many bits as commands which can be queued. That is, if 32 commands can be queued, the command status field has 32-bit data. Each bit can indicate the status of a command associated with the corresponding tag.

For example, if a certain bit is set, this indicates the successful completion of a command which is associated with a tag corresponding to the bit. It is also possible for one command completion notification to notify the host 110 that plural commands have completed successfully as mentioned above. By setting plural bits of the command status field, the host 110 can be notified at a time of the respective completions of plural commands. On the other hand, by clearing bits, it is possible to notify that the commands associated with the corresponding tags have not yet been completed. For NCQ, "Set Device Bits FIS" is an example of a command completion notification and the "SActive" field is an example of a command status field.

Figure 6:
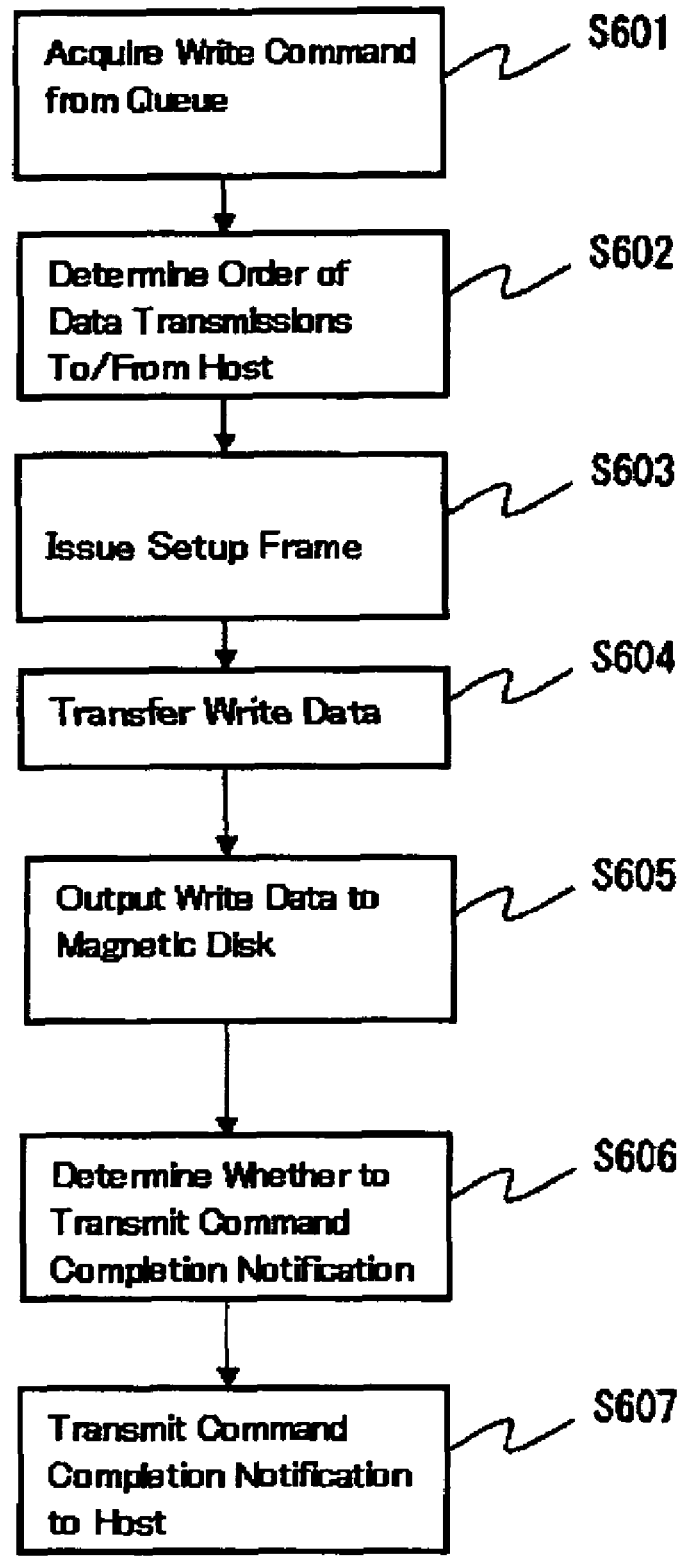
FIG. 6 is a flowchart for illustrating how data transmission is controlled to process a write command in the embodiment.

Firstly, with reference to FIG. 6, the following provides a basic description of how write command processing is performed. It is assumed in the following description that write cache is disabled. If a write command is acquired from the queue manager 223 (S601), the command execution manager 222 requests the host interface manager 221 to start data transfer from the host 110. According to a prescribed algorithm, the host interface manager 221 determines the order of data (including control data such as command completion notifications as well as user data) transmissions to be done with the host 110 (S602). In this example, in response to the request, the host interface manager 221 requests the host interface 211 to start a write data transfer. In response to the request, the host interface 211 issues a setup frame (S603).

In response to the request, the host 110 transfers write data (604). The transferred write data is stored in the memory 130 by way of the host interface 211 and the memory manager 213. Upon receipt of a data transfer completion notification from the host interface 211, the host interface manager 221 notifies the command execution manager 222 of the transfer completion. The command execution manager 222 requests the drive manager 224 to write the data. Under the supervision of the drive manager 224, the drive interface 212 outputs the write data, which is acquired from the memory 130 via the memory manager 213, to the magnetic disk 121 (S605).

If write cache is disabled as assumed, a command completion notification is done upon completion of the data write to the magnetic disk 121. Notified by the HDC 128 via the command execution manager 222 that the write data has been written to the magnetic disk 121, the host interface manager 221 determines whether to transmit a command completion notification (S606). The timing of transmitting the command completion notification is determined from the view point of internal operational efficiency by taking other commands or command completion notifications into consideration. If the host interface manager 221 determines to transmit the command completion notification, it requests the host interface 211 to transmit a command completion notification indicating the tag of the completed command. To the host 110, the host interface 211 transmits a command completion notification with the corresponding bit set in the status field (S607).

Figure 7:
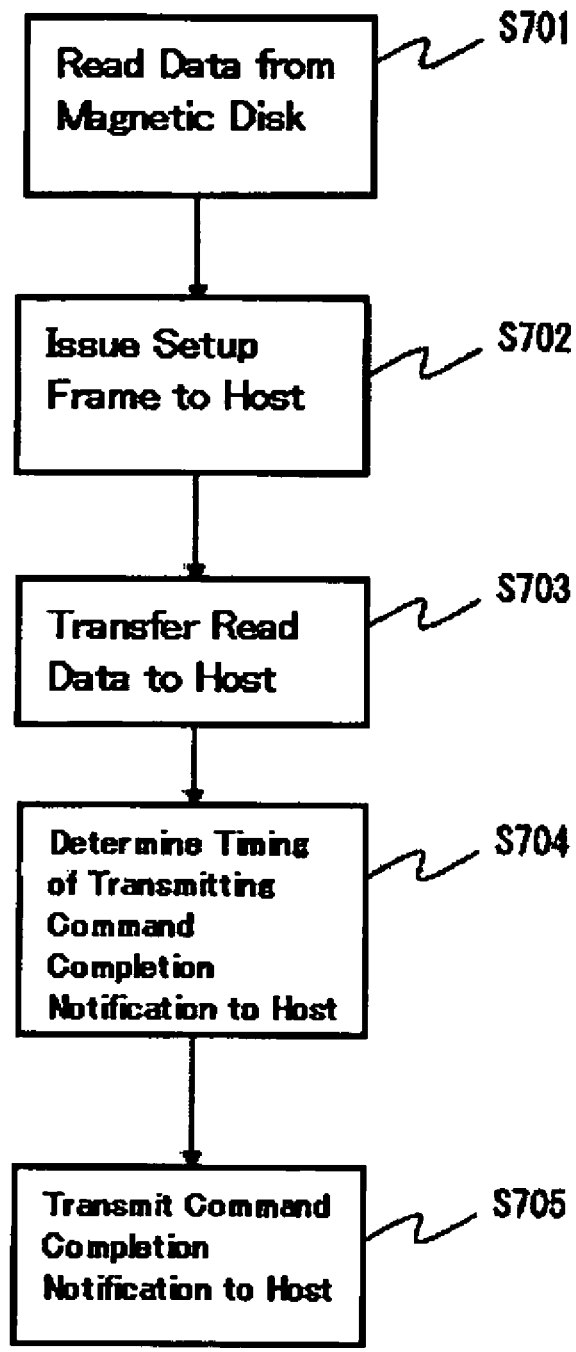
FIG. 7 is a flowchart for illustrating how data transmission is controlled to process a read command in the embodiment.

Meanwhile, the following provides a basic description of how read processing is performed with reference to FIG. 7. The command execution manager 222 requests the drive manager 224 to read data from the magnetic disk 121. Under the control of the drive, manager 224, the read data from the magnetic disk 121 is stored in the memory 130 by way of the drive interface 212 and the memory manager 213 (S701). Further, the command execution manager 222 passes a read data transfer request to the host interface manager 221.

In response to the request from the command execution manager 222, the host interface manager 221 requests the host interface 211 to start a data transfer to the host 110. In response to the request, the host interface 211 issues a setup frame (S702). The host interface 211 acquires the read data stored in the memory 130 via the memory manager 213 and transfers the read data to the host 110 (S703). Upon completion of the transfer processing, the host interface 211 notifies the host interface manager 221 that the read data has been transferred.

The host interface manager 221 determines the timing of transmitting a command completion notification by taking other commands or command completion notifications into consideration (S704). For example, the notification may be transmitted either upon completion of the read processing or at a later timing preferable in view of performance. To transmit the notification, the host interface manager 221 requests the host interface 211 to transmit the command completion notification. To the host 110, the host interface 211 transmits the command completion notification with the corresponding bit set in the status field (S705).

The following describes some preferable modes of controlling the timing of issuing a command completion notification. As mentioned above, transmission of command completion notifications to the host 110 is managed by the host interface manager 221. One preferable mode is for controlling the timing of issuing a command completion notification when two queued write commands in the command queue 231 are successively processed. If the address difference between the respective data for the two commands is not larger than a predefined value, the host interface manager 221 postpones the transmission of the command completion notification for the first write command. In other words, if the respective addresses are adjacent or near to each other, the corresponding accesses to the magnetic disk can be done without rotational delay between them. In this case, the host interface manager 221 postpones the transmission of the command completion notification for the first write command.

After the write data for one write command is transferred from the host 110, the write data for the other write command is transferred without transmission of any command completion notification. By transferring the next write data earlier so as to successively transfer the two write data, it is possible to avoid deterioration in performance due to rotational delay. Note that although two write commands are assumed in the following description, it is also possible to apply the same procedure to three or more write commands and reduce the latency.

Figure 8:
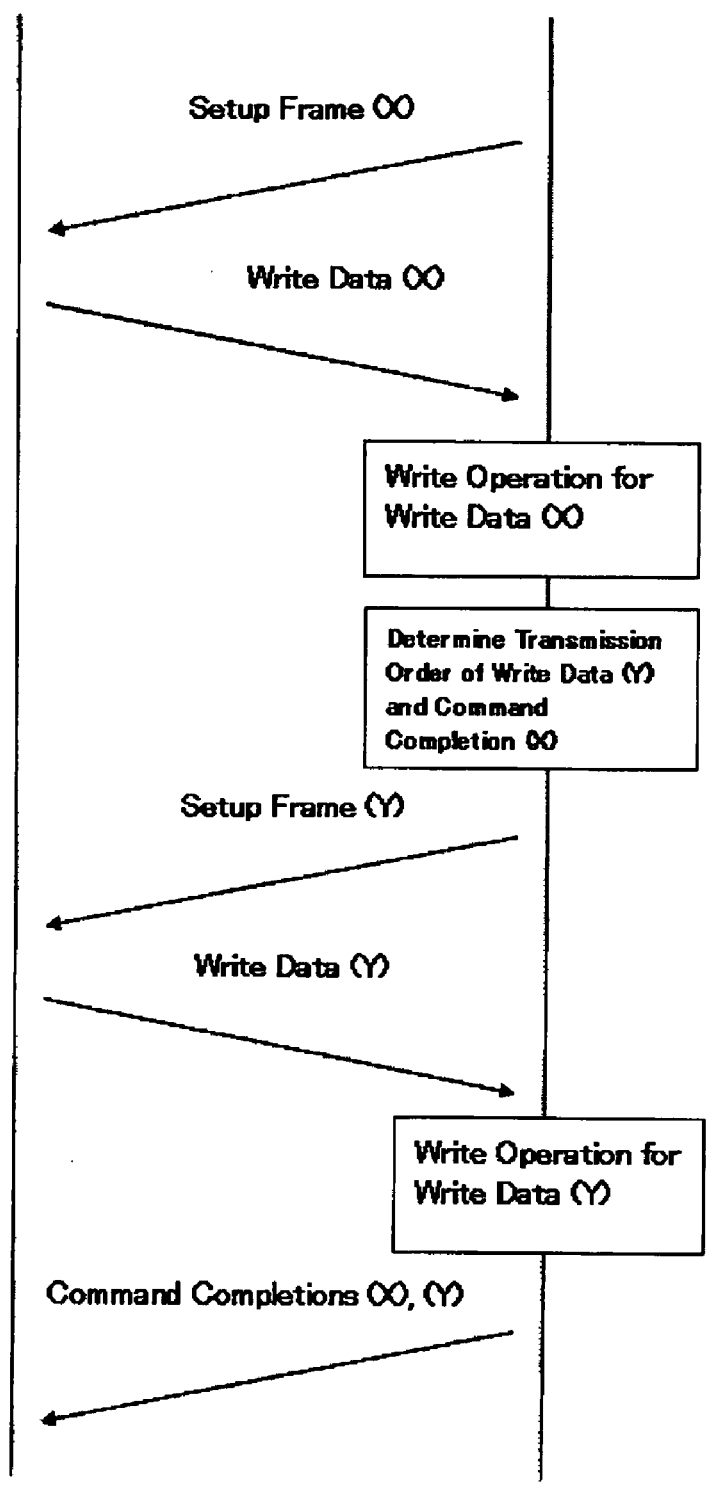
FIG. 8 is a sequence diagram for illustrating how host-device data transmission is performed when two queued commands are successively processed in the embodiment.
Figure 9:
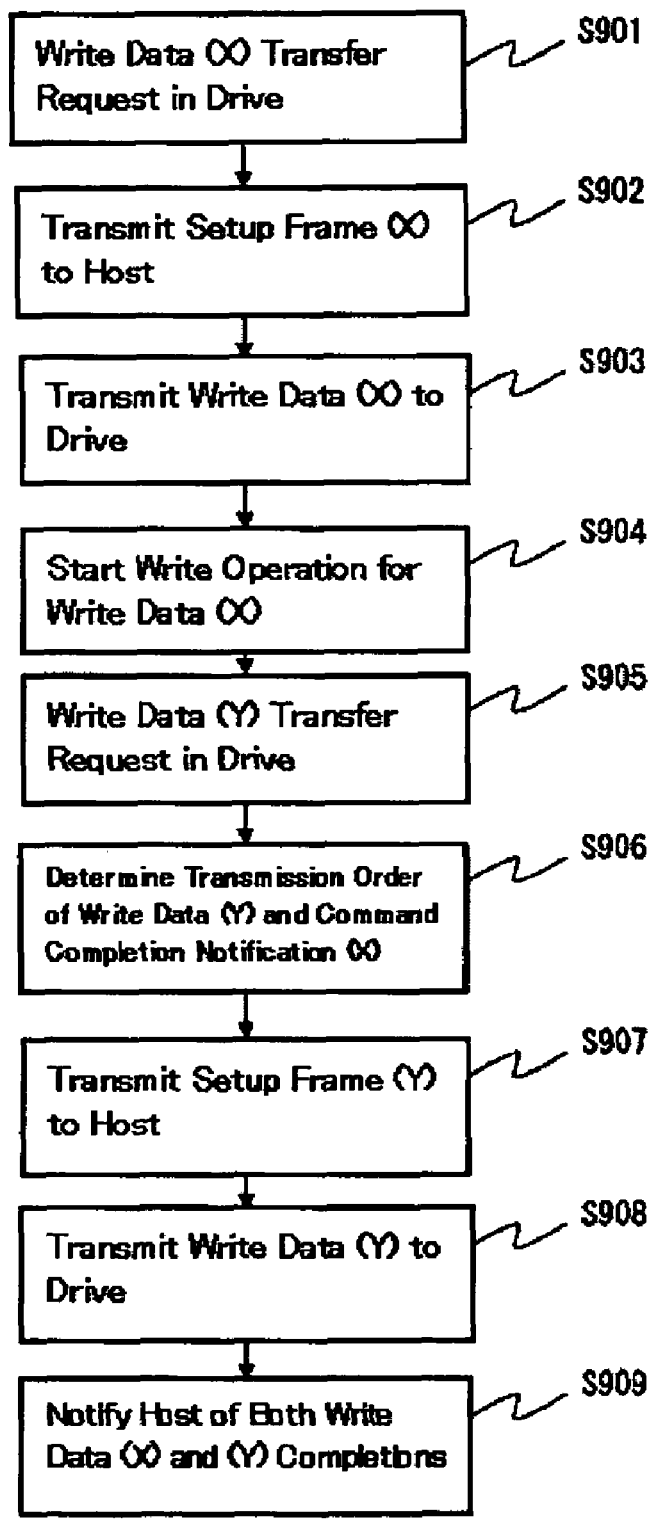
FIG. 9 is a flowchart for illustrating how host-device data transmission is performed when two queued commands are successively processed in the embodiment.
Figure 10:
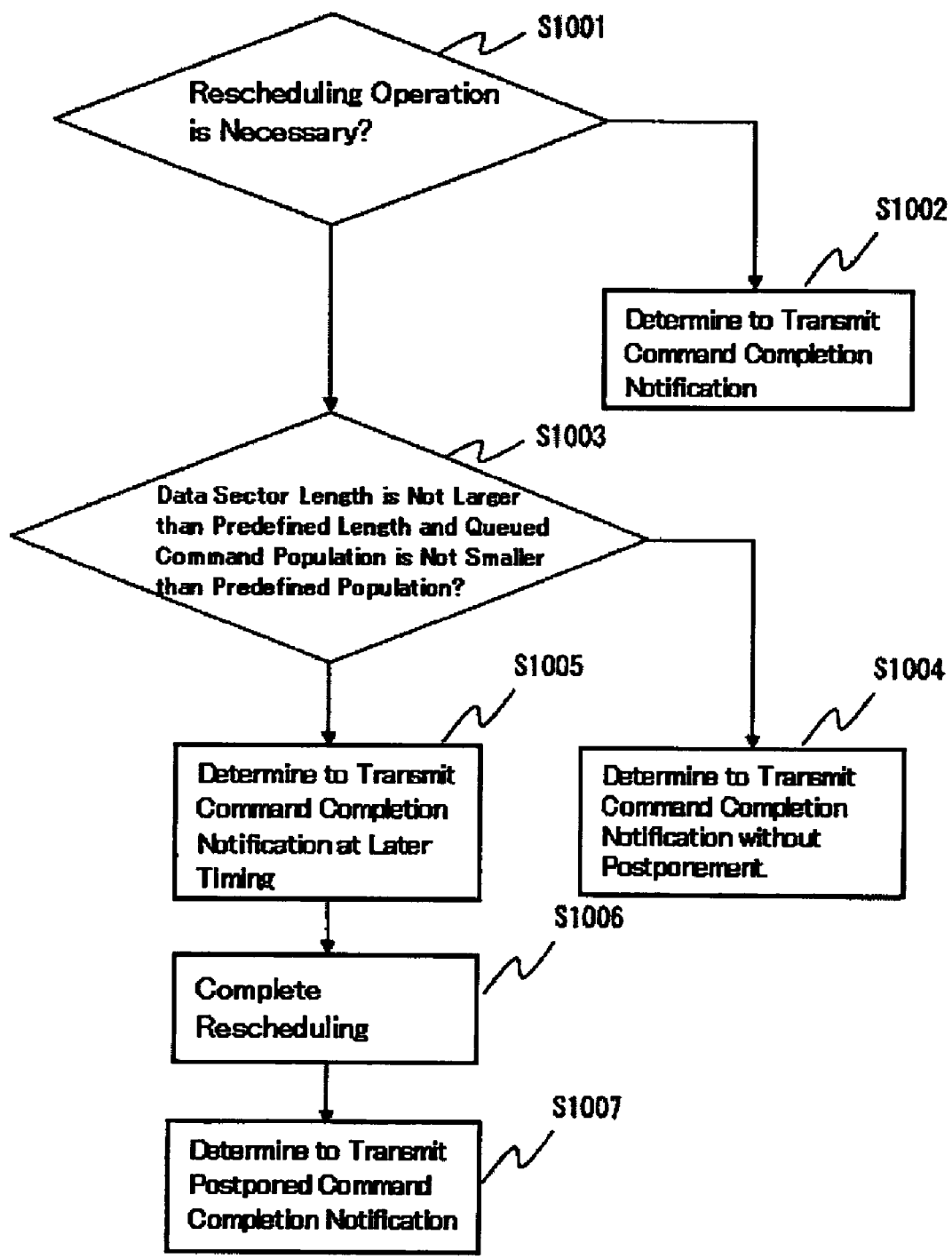
FIG. 10 is a flowchart for illustrating how the timing to issuing a command completion notification is controlled in the embodiment if the data sector length for a command is small and the queued command population is large.
Figure 11:
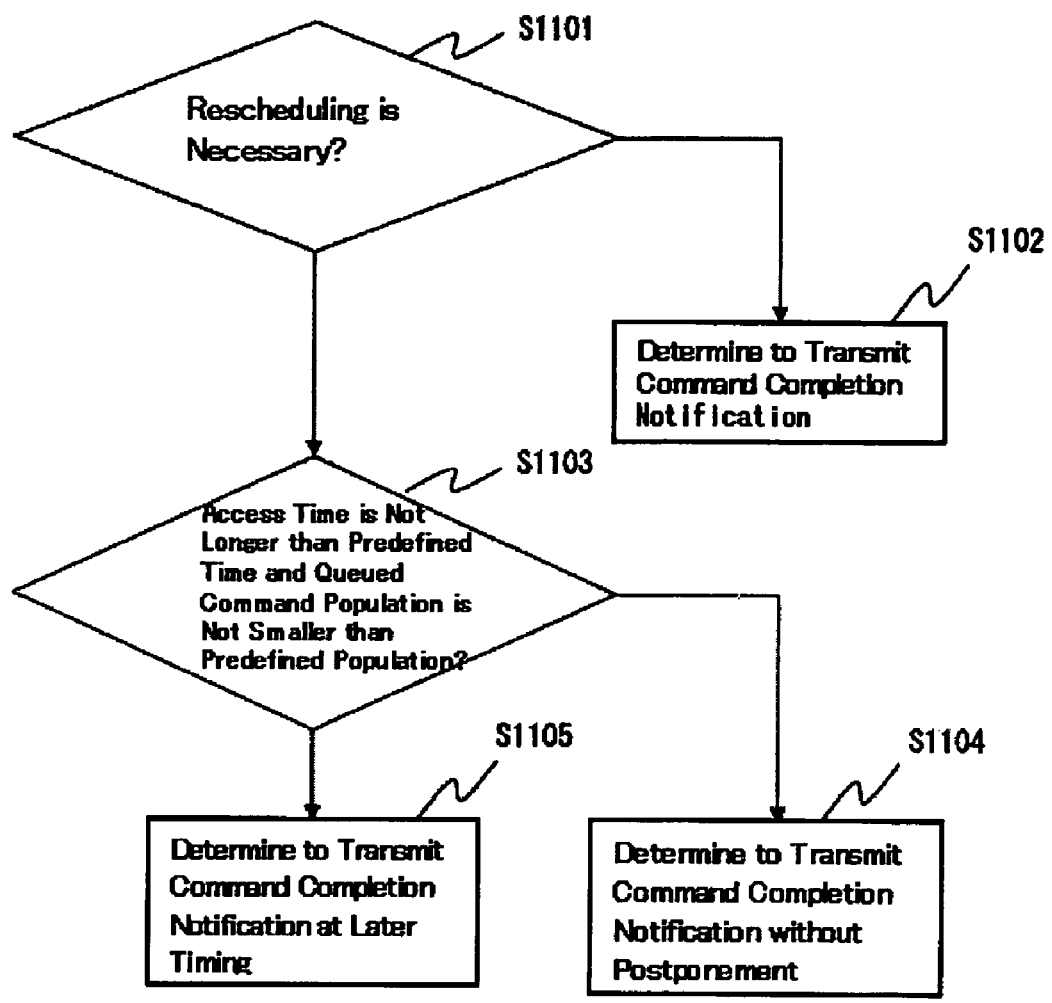
FIG. 11 is a flowchart for illustrating how the timing to issuing a command completion notification is controlled in the embodiment if the media access time for a command is small and the queued command population is large.

With reference to FIG. 8 and FIG. 9, the following provides a concrete description of the procedure. FIG. 8 is a sequence diagram of data transmission between the host 110 and the hard disk drive 120 whereas FIG. 9 is its flowchart. In the command queue 231, a write command (X) identified by tag X and a write command (Y) identified by tag Y are queued. In addition, write cache is disabled as assumed above. In response to a request from the queue manager 223, the command execution manager 222 requests the host interface manager 221 to transfer the write data for the write command (X) (S901).

To the host 110, the host interface 211 under the control of the host interface manager 221 transmits a setup frame (X) for write data transfer (S902). In response to the setup frame (X), the host 110 transmits write data (X) to the hard disk drive 120 (S903). The write data (X) is stored in the data buffer 232 via the HDC 128. After the write data (X) begins to be transmitted or upon completion of the previous access to the magnetic disk, seek and write to the magnetic disk are started for the write data (X) (S904). As mentioned above, the write operation for the write data (X) is executed by the drive interface 212 under the supervision of the drive manager 224 which has received the request from the command execution manager 222.

While the write data (X) is being transferred or written, the command execution manager 222 requests the host interface manager 221 to transfer write data for the write command (Y) (S905). The host interface manager 221 refers to acquired address information regarding the write data (x) and write data (Y) and, based on the address information, determines an order in which the transfer of the write data (Y) and the transmission of the command completion notification (X) for the write data (X) are to be executed (S906). If the write data (Y) address is adjacent or near to the write data (X) address, it may be possible to raise the performance by postponing the command completion notification (X). Preferably in this case, it is determined that the transfer of the write data (Y) is to be executed before the transmission of the command completion notification (X). In particular, if write to the magnetic disk is possible without waiting for rotation, the transfer of the write data (Y) will be executed earlier. If this condition is met, the command completion notification (X) will be transmitted earlier.

If earlier execution of the write data (Y) transfer is determined, the host interface 211, under the control of the host interface manger 221, transmits a setup frame (Y) to the host 110 in order to transfer the write data (Y) (S907). In response to the setup frame (Y), the host 110 transmits the write data (Y) to the hard disk drive 120 (S908). The write data (Y) is stored in the data buffer 232 via the HDC 128.

After the write data (Y) is written completely, its completion notification is sent from the HDC 128 to the host interface manager 221 via the command execution manager 222. The host interface manager 221 determines to transmit a command completion notification concerning the write data (X) and write data (Y). By transmitting a single command notification in which the corresponding bits in the command status field are set, the host interface 211 notifies the host 110 at a time that both write data (X) and write data (Y) have been written completely (S909). Alternatively it is also possible to transmit two command completion notifications (X) and (Y) either successively or at certain separate timings to the host 110. Note that the command completion notification control described so far is not limited to data write processing.

The following describes another preferable mode of controlling the timing of issuing a command completion notification. In this mode, the timing of issuing a command completion notification is postponed, for example, in order to secure a period of time it takes to reschedule the queued commands. In particular, an appropriate period of time for rescheduling can be secured by postponing a command completion notification based on the relation between the command execution time and the rescheduling time. Postponing the timing of issuing a command completion notification this way makes it possible to appropriately rearrange the command execution order.

If the sector length of the read or write data for one command is small, there arises a possibility that the time required for the rescheduling cannot be secured. If the sector length (data length) is small, the time available for rearranging the command execution order is short. Due to this, if the number of queued commands is larger than a certain number, the time for performing appropriate scheduling may not be secured. In this mode, the host interface manager 221 controls the timing of issuing a command completion notification based on the population of commands stored in the queue and the length of the data for the execution command.

Upon completion of the read data transmission operation for one read command or upon completion of the data write operation for one write command to the magnetic disk, the host interface manager 221 becomes possible to transmit a command completion notification to the host 110. Before requesting the host interface 211 to transmit a command completion notification, the host interface manager 221 determines whether to transmit a command completion notification for the completed command based on the sector length of the execution command and the population of commands queued in the command queue 231.

If no rescheduling operation is necessary (S1001), the host interface manager 221 determines to transmit a command completion notification and requests it to the host interface 211 (S1002). Preferably, if plural command completion notifications are pending, a command completion notification covering all of the plural commands is issued. The same holds true in the following description. If a rescheduling operation is necessary (S1001), the host interface manager 221 acquires information about the population of queued commands from the queue manager 223. In addition, the host interface manager 221 acquires information about the sector length of the data for the execution command from the queue manager 223. Information about them is acquired at an appropriate timing. The host interface manger 221 compares the command population with the sector length.

The host interface manager 221 judges whether the time it takes to reschedule the queued command population can be secured by the time to be used to process the execution command data. Preferably, the host interface manager 221 determines to postpone the transmission of a command completion notification if the sector length of the data for the execution command is not larger than a predefined length and the population of queued commands is not smaller than a predefined population (S1003). Such criterial lengths and populations are predefined on an each command/processing type basis.

If the above condition is not met, that is, the sector length is larger than the prescribed length or the command population is smaller than the prescribed population, the host interface manager 221 judges that the time it takes to reschedule the queued commands can be secured and determines to transmit a command completion notification to the host without postponing it (S1004). If the above condition is met, and the host interface manager 221 judges that the time required for the rescheduling cannot be secured, the host interface manager 221 determines to transmit a command completion notification at a later timing without transmitting it immediately (S1005).

Upon completion of the rescheduling, the queue manager 223 notifies the host interface manger 221 of the completion (S1006). In response to the notification, the host interface manager 221 determines to issue the postponed command completion notification and requests the host interface 211 to transmit the command completion notification (S1007). Note that it is also possible for the host interface manager 221 to postpone the issuance of the command completion notification again after the rescheduling is completed.

In other words, it is preferable that pending command completion notifications, if any, are positively be returned to the host 110 at this timing if the command execution time is sufficiently long due to the sector length being large. If the command execution time is longer than the rescheduling time, pending command completion notifications are positively transmitted. For example, if the sector length is not smaller than the predefined length and the queued command population is not larger than the predefined population, it is possible to determine to transmit the pending command completion notification. Since the number of tag numbers available concurrently is limited, returning a command completion notification to the host 110 makes it possible for the host 110 to issue new commands. Increasing the number of queued commands allows the hard disk drive 120 to perform more appropriate command rescheduling.

In this mode described so far, whether to postpone a command completion notification is determined from the relation between the sector length and the queued command population. In another preferable mode, whether to postpone a command completion notification is determined from the relation between the media access time for the execution command and the population of queued commands. If the media access time, including seek time and rotational latency, required for the read or write data for one command is shorter, the time available to reschedule commands is shorter. In this case, if the population of queued commands is not so small, it is possible that the time it takes to perform appropriate rescheduling cannot be secured. Thus, the host interface manager 221 controls the timing of issuing a command completion notification based on information about the commands stored in the queue and the media access time for the execution command.

Similar to the aforementioned mode, a command completion notification becomes ready to be transmitted to the host. Then, before requesting the host interface 211 to transmit a command completion notification, the host interface manager 221 determines whether to transmit a command completion notification for the completed command based on the media access time for the execution command and the population of commands queued in the command queue 231.

If no rescheduling operation is necessary for the queued commands (S1101), the host interface manager 221 determines to transmit a command completion notification and requests it to the host interface 211 (S1102). If a rescheduling operation is necessary (S1101), the host interface manager 221 acquires information about the population of queued commands from the queue manager 223. In addition, the host interface manager 221 acquires information about the media access time for the execution command from the queue manager 223. Information about them is acquired at an appropriate timing. The host interface manger 221 compares the command population with the media access time.

The host interface manager 221 judges whether the time it takes to reschedule the queued command population can be secured by the media access for the execution command. Preferably, the host interface manager 221 determines to postpone the transmission of a command completion notification if the media access time for the execution command is not larger than a predefined time and the population of queued commands is not smaller than a predefined population (S1103). Such criterial times and populations are predefined on an each command/processing type basis.

If the above condition is not met, that is, the media access time is larger than the prescribed length or the command population is smaller than the prescribed population, the host interface manager 221 judges that the time it takes to reschedule the queued commands can be secured and determines to transmit a command completion notification to the host 110 without postponing it (S1104). If the above condition is met, and the host interface manager 221 judges that the time required for the rescheduling cannot be secured, the host interface manager 221 determines to transmit a command completion notification at a later timing without transmitting it immediately (S1105). Upon completion of the rescheduling, the queue manager 223 notifies the host interface manger 221 of the completion.

The subsequent processing is same as in the aforementioned mode. Also in this mode, it is preferable that pending command completion notifications, if any, are positively returned to the host 110 at this timing if the command execution time is sufficiently long due to the media access time being long. If the command execution time is longer than the rescheduling time, pending command completion notifications are positively transmitted. For example, if the media access time is not shorter than the predefined time and the queued command population is not larger than the predefined population, it is possible to determine to transmit the pending command completion notification.

Note that the present invention is not limited to serial transmission or serial ATA protocols. In addition, the logical configuration for each processing is not limited to the corresponding one in the storage device embodiment described so far. Either functional or circuit configuration of the storage device embodiment can be improved in efficiency by designers skilled in the art. Also note that although the magnetic heads 122 in this embodiment are read-write heads capable of performing read and write operations, the present invention may also be applied to reproducing-only devices. In addition, although the present invention is particularly useful for magnetic disk storage devices, it is also applicable to other types of storage devices which drive recording media, such as optical disk storage devices.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A data transmission control method for controlling data transmission between a host and a storage device, comprising:
   acquiring a queued first command;
   acquiring address information regarding first data which is for the first command;
   transmitting the first data between the host and the storage device;
   acquiring a queued second command;
   acquiring address information regarding second data which is for the second command;
   based on the address information regarding the first data and second data, determining whether to transmit the second data between the host and the storage device before transmitting a completion notification concerning the first command to the host from the storage device;
   according to the determination made in the determining step, transmitting the second data between the host and the storage device; and
   after processing of the first command is completed, transmitting said completion notification concerning the first command to the host after the second data is transmitted,
   wherein transmitting the second data between the host and the storage device includes writing the second data to a rotating media.

2. A data transmission control method according to claim 1, wherein if the difference between the address for the first data and the address for the second data is smaller than a predefined value, said determining step determines to transmit the second data before transmitting said completion notification concerning the first command.

3. A data transmission control method according to claim 1, wherein:
the first command and the second command are respectively to perform media accesses to rotating media; and
based on said address information regarding the first data and second data, said determining step determines to transmit the second data before transmitting said completion notification concerning the first command if the media access to the second data is possible without rotational latency after the media access to the first data.

4. A data transmission control method according to claim 1, wherein the first command and the second command are write commands which are respectively to write data to media.

5. A data transmission control method according to claim 1, wherein:
the first command and the second command are commands which are respectively to write data to rotating media;
the second command is queued following the first command; and
based on said address information regarding the first data and second data, said determining step determines to transmit the second data before transmitting said completion notification concerning the first command if write of the second data to the media is possible without rotational latency after write of the first data to the media.

6. A data transmission control method according to claim 1, wherein:
the first command and the second command are commands which are respectively to write data to rotating media;
the second command is queued following the first command; and
said determining step determines to transmit the second data before transmitting said completion notification concerning the first command if the address for the second data is adjacent to the address for the first data.

7. A data transmission control method for controlling data transmission between a host and a storage device, comprising:
acquiring a queued first command;
executing the first command;
acquiring information regarding queued commands;
based on the time for executing the first command and the time for rescheduling the queued commands, determining the timing of transmitting a command completion notification concerning the first command; and
transmitting said completion notification concerning the first commands,
wherein the completion notification is transmitted after data associated with a second command has been written to a rotating media.

8. A data transmission control method according to claim 7, wherein said time for executing the first command is estimated according to the sector length of the data for the first command.

9. A data transmission control method according to claim 7, wherein said time for executing the first command is estimated according to the media access time for the data for the first command.

10. A data transmission control method according to claim 7, wherein said time for rescheduling the queued commands is estimated according to the population of the queued commands.

11. A data transmission control method according to claim 7, wherein if said sector length of the data for the first command is not larger than a predefined value and said number of the queued commands is not smaller than a prescribed value, said command completion notification concerning the first command is postponed.

12. A data transmission control method according to claim 7, wherein if said media access time for the data for the first command is not larger than a prescribed value and said number of the queued commands is not smaller than a prescribed value, said command completion notification concerning the first command is postponed.

13. A data transmission control method according to claim 7, wherein said command completion notification concerning the first command is transmitted after said rescheduling of the queued commands is complete.

14. A storage device comprising:
a command queue where plural commands transmitted from a host are stored;
a command order determination section which determines to execute a first command and a second command, which are stored in the command queue, in said order;
a data transmission control section which, based on address information regarding first data for the first command and address information regarding second data for the second command, determines whether to postpone the timing of transmitting a completion notification concerning the first command to the host until the second data is transmitted to or from the host; and
a data transmission section which, under the control of said data transmission control section, transmits the first data to or from the host, and transmits said completion notification concerning the first command after processing of the first command is completed and the second data is transmitted,
wherein transmitting the second data between the host and the storage device includes writing the second data to a rotating media.

15. A storage device according to claim 14, further comprising rotating media where data is stored, wherein:
the first and second commands are commands which are respectively to write data to the media; and
if the difference between the address for the first data and the address for the second data is smaller than a predefined value, the data transmission control section determines to postpone the timing of transmitting said completion notification concerning the first command to the host until the second data is transmitted from the host.

16. A storage device according to claim 14, further comprising rotating media where data is stored, wherein:
the first and second commands are commands which are respectively to write data to the media; and
if the address for the second data is adjacent to the address for the first data with a difference which is smaller than a predefined value, the data transmission control section determines to postpone the timing of transmitting said completion notification concerning the first command to the host until the second data is transmitted from the host.

17. A storage device, comprising:
rotating media on which data is stored;

a command queue where plural commands transmitted from a host are stored;

a command order determination section which determines an order in which the commands stored in the command queue are to be executed;

a data transmission control section which based on the length of the data for an execution command determined by the command order determination section and used for access to the media and on the number of the commands stored in the command queue, determines the timing of transmitting a command completion notification concerning the execution command to the host; and a data transmission section which transmits said command completion notification to the host in response to a request from the data transmission control section, wherein the data transmission section is configured to transmit the command completion notification after more than one of the plural commands have been executed and written to the rotating media.

18. A storage device according to claim 17, wherein the data transmission section transmits said command completion notification to the host after rescheduling of the commands stored in the command queues is done.

19. A storage device, comprising:

rotating media on which data is stored;

a command queue where plural commands transmitted from a host are stored;

a command order determination section which determines an order in which the commands stored in the command queue are to be executed;

a data transmission control section which based on the media access time for the data for an execution command determined by the command order determination section and used for access to the media and on the number of the commands stored in the command queue, determines the timing of transmitting a command completion notification concerning the execution command to the host; and a data transmission section which transmits said command completion notification to the host in response to a request from the data transmission control section, wherein the data transmission section is configured to transmit the command completion notification after more than one of the plural commands have been executed and written to the rotating media.

* * * * *

UNITED STATES PATENT AND TRADEMARK OFFICE
CERTIFICATE OF CORRECTION

PATENT NO. : 7,320,050 B2
APPLICATION NO. : 11/031494
DATED : January 15, 2008
INVENTOR(S) : Kobayashi et al.

It is certified that error appears in the above-identified patent and that said Letters Patent is hereby corrected as shown below:

Title Page:

In the bibliographic data, at Item (56) References Cited,

Please delete  "2002/0059478  A1   5/2002    Yamada"
and insert    --2002/0059476  A1   5/2002    Yamada--

In the Claims:

Claim 7, Column 17, Line 56, please delete "commands" and insert --command--.

Signed and Sealed this

Thirteenth Day of May, 2008

JON W. DUDAS
*Director of the United States Patent and Trademark Office*